No. 878,005. PATENTED FEB. 4, 1908.
J. E. JOHNSON.
AUTOMOBILE DRIVING GEAR.
APPLICATION FILED FEB. 16, 1907.

2 SHEETS—SHEET 1.

WITNESSES:

INVENTOR:
John E. Johnson
BY his ATTORNEY:
A. M. Carlsen.

No. 878,005.

PATENTED FEB. 4, 1908.

J. E. JOHNSON.
AUTOMOBILE DRIVING GEAR.
APPLICATION FILED FEB. 16, 1907.

2 SHEETS—SHEET 2.

WITNESSES:
D. E. Carlsen
D. E. Carlsen

INVENTOR.
John E. Johnson.
BY his ATTORNEY:
A. M. Carlsen.

UNITED STATES PATENT OFFICE.

JOHN E. JOHNSON, OF LEAF MOUNTAIN TOWNSHIP, OTTER TAIL COUNTY, MINNESOTA.

AUTOMOBILE DRIVING-GEAR.

No. 878,005.

Specification of Letters Patent.

Patented Feb. 4, 1908.

Application filed February 16, 1907. Serial No. 357,657.

*To all whom it may concern:*

Be it known that I, JOHN E. JOHNSON, citizen of the United States, residing at the township of Leaf Mountain, in the county of Otter Tail and State of Minnesota, have invented certain new and useful Improvements in Automobile Driving-Gear; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to driving gear for automobiles and other vehicles driven by a motor carried on the vehicle; and the objects are, to provide a driving gear which renders easy the steering, starting, stopping and reversing of the vehicle, and also enables the motive power to be applied to all the ground wheels and to be converted into slow and powerful motion of the ground wheels in going up inclines.

These objects I attain by the novel construction and arrangement of parts illustrated in the accompanying drawings, in which—

Figure 1:
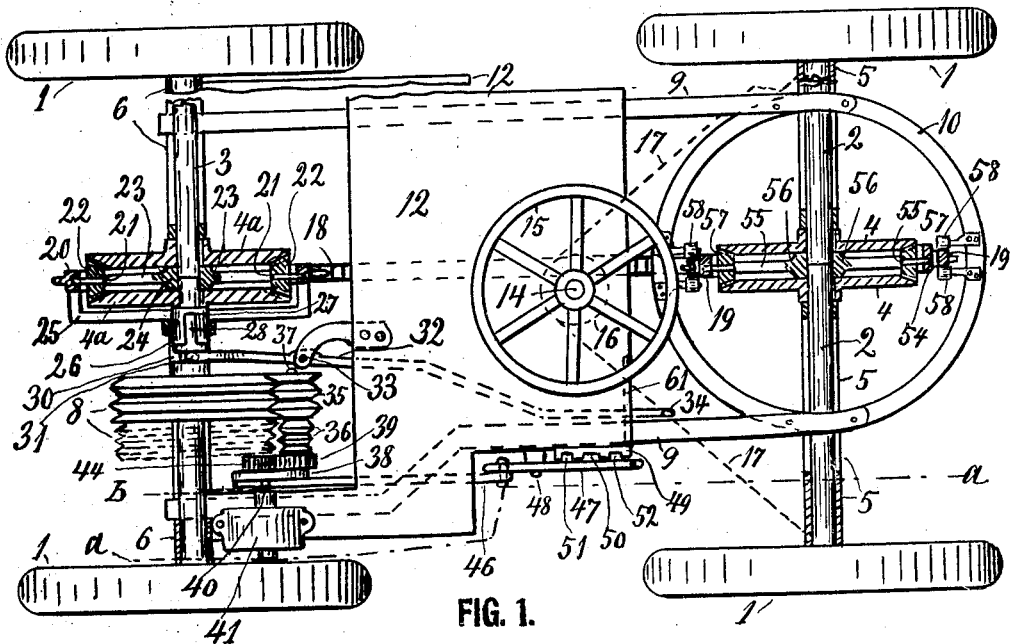
Figure 2:
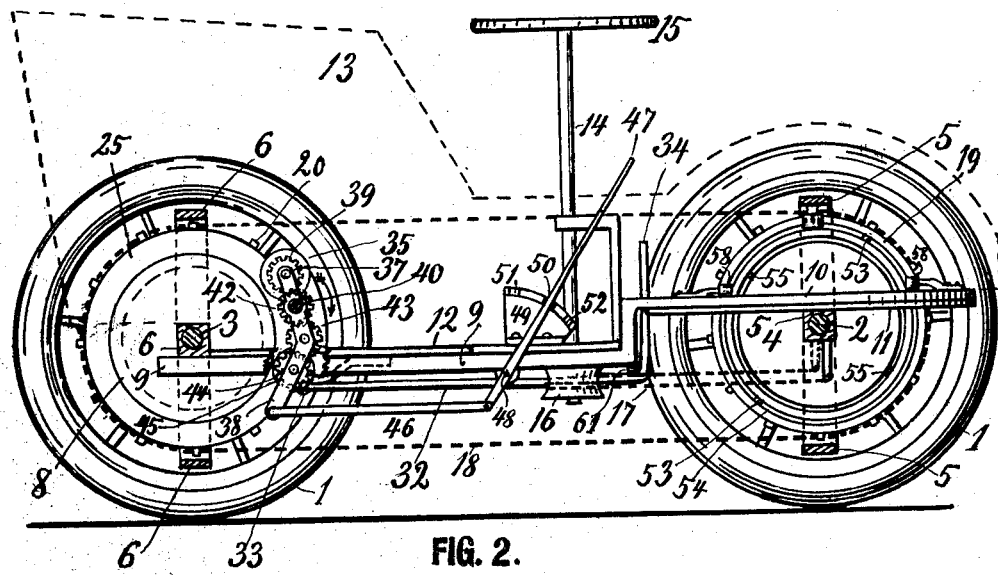
Figure 3:
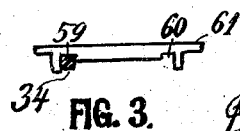
Figure 4:
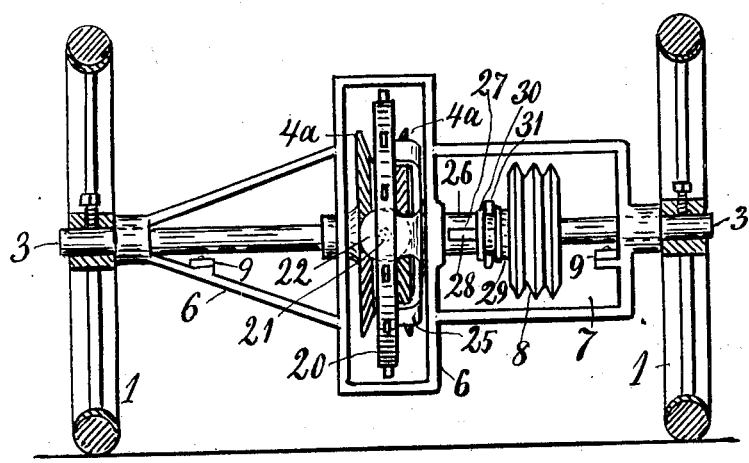
Figure 5:
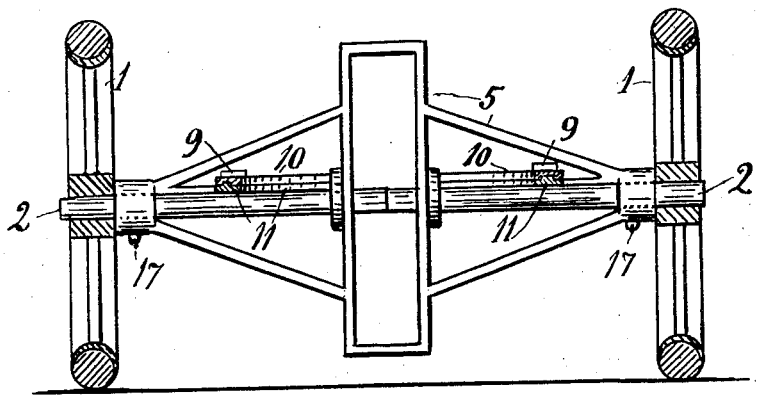
Figure 6:
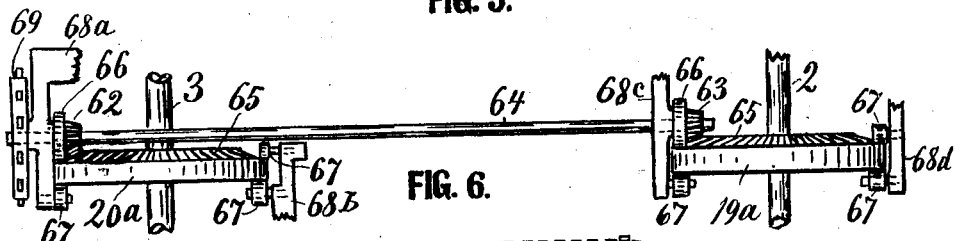
Figure 7:
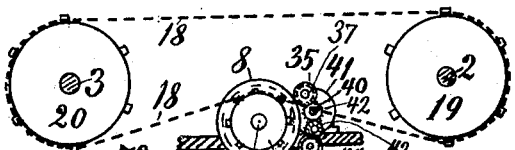

Figure 1 is a partly sectional top view of an automobile to which my improvements are applied; many parts of the vehicle are omitted, and the parts shown in section are intersected substantially on a horizontal plane with the supporting axles. Fig. 2 is a sectional side elevation of the automobile on the line *a a* in Fig. 1 except that the shaft 40 of the eectric motor 41 is intersected at *b*, and the motor is removed together with the portion of the platform supporting it. Fig. 3 is a detail front elevation of the lever-keeper 61 in Fig. 1. Fig. 4 is a rear end elevation of the automobile with the supporting wheels in section and all parts omitted which need not be shown in said view. Fig. 5 is a front end elevation of the automobile with the supporting wheels and the fifth-wheel in vertical section near the axle, and all parts omitted which are fully understood from the other views. Fig. 6 is a top view of a modification of certain parts of the drive mechanism. Fig. 7 is a side elevation of another modification of the drive mechanism.

Referring to the drawing by reference numerals, 1 designates the four supporting wheels, while 2 is the front and 3 the rear axle of the automobile. Each axle is divided in the middle into two sections, each of which has to its outer end fixed one of the supporting wheels, and on its inner end fixed a bevel gear 4, or 4ª. The front axle is journaled in a yoke-shaped frame 5 and the rear axle in a similar frame 6, which is formed with an extra large space 7 for the friction wheel 8 to move in when sliding on the axle. Said wheel 8 has V-shaped peripheric grooves in its face. The frames 5 and 6 are secured together by hounds 9, which may be fixed to any suitable point of the rear frame while their front ends are secured to the upper part 10 of a fifth-wheel having its lower part 11 fixed to the front frame 5. Upon said hounds is fixed the platform 12, which may be the bottom or floor of the vehicle body 13, shown only in the dotted outline in Fig. 3. In the frame work thus constructed is journaled a vertical shaft 14, having affixed to its upper end a hand-wheel 15, and to its lower end a roller 16, around which is taken a few coils of a chain 17 secured thereto and having its ends secured to the ends of the front frame 5, so that the front wheels may be steered by said hand-wheel 15.

The axles 2 and 3 are rotated in unison by means of an endless chain 18 and two sprocket wheels 19 and 20, of which in Figs. 1 and 2, 19 is driven and 20 is the driver. The wheel 20 has two or more internal radial studs 21, on which revolve bevel-pinions 22, meshing with the bevel gears 4ª; said studs are formed of the outer ends of arms or spokes 23 of a hub 24 journaled upon the abutting ends of the rear axle. To one side of the sprocket wheel 20 is secured a spider 25, whose sleeve-shaped hub 26 revolves on the axle and is provided with deep clutch notches 27, in which slide clutch-fingers 28 of a sleeve 29, which is provided with an annular groove 30, engaged by a shifter fork 31 of a shifter lever 32, pivoted at 33 and having its front end 34 turned upward within reach of the occupant of the vehicle, so that he may swing it from side to side and thus move the grooved friction wheel 8 into two different positions, as shown in solid line and dotted line in Fig. 1, whereby its grooves may be engaged by the V-shaped grooves of a large friction pinion 35 for ordinary speed or the V-shaped grooves of a small pinion 36 for slow and powerful speed. Both of said pinions are secured together and to a gear wheel 39, all revolving together on a stud or short shaft 37, fixed in a lever 38, which is fulcrumed on the shaft 40 of the electric motor 41. On said shaft 40 is fixed a cog-pinion 42 driving the gear 39 and also the meshing idler-gear 43 and thereby the gear 44, which all revolve on studs carried by the same lever 38. To the gear 44 is fixed a friction pinion 45 of about the same size as 35 and in vertical line of movement, so that when the pinion 35 is applied to the wheel 8 the automobile will move forward, and if the pinion 45 is applied the movement will be reversed, hence the several meshing gears and the idler on the lever 38; which lever is tilted by a rod or link 46 and a hand lever 47, pivoted at 48 and held in three different positions by a notched section 49, whose notch 50 holds the friction pinion 35 engaged, notch 51 holds the smaller pinion 36 engaged for slow and powerful motion, and notch 52 holds the pinion 44 engaged with the wheel 8 when reversed motion is required. The front sprocket wheel 19, is supported on two diametrically opposite studs or trunnions 53, fixed in a ring 54, which at ninety degrees from each stud 53 is supported by trunnions 55 extending from a hub 56 and forming journals for two bevel pinions or compensating gears which mesh with the bevel gears 4. The hub 56 is loosely journaled upon the abutting ends of the front axle. 58 are rollers guiding the front sprocket wheel so as to keep it always in line with the chain 18 driving it.

From the above description it will be understood that in steering the front axle may turn from side to side with the lower part of the fifth-wheel while the chain wheel is by said rollers 58, and other rollers not shown, kept in proper line with the drive-chain; and that the automobile may be stopped, started and reversed and have its speed changed almost noiselessly and without jerking, since the friction wheels will engage each other gently and slip slightly at the beginning of the contact with one another.

It will also be understood that although all four of the supporting wheels 1 are driven by the bevel-gears 4 and 4ᵃ, sprocket-wheels 19—20, compensating gears or pinions carried thereby and engaging the bevel gears to revolve them normally at the same rate of speed, the steering of the vehicle to either side causes the compensating pinions between the bevel gears to turn on their trunnions sufficiently to prevent dragging motion of any of the supporting and driving wheels on the ground.

The lever 34 engages alternately the two notches 59 and 60 (see Fig. 3) of a keeper 61, secured as shown in Figs. 1 and 2. This lever is first placed in the desired position for fast or slow motion by the friction pinion 35 or 36 before any of them is set to work by the lever 47.

In the modification in Fig. 6 is shown how the wheels 19ᵃ and 20ᵃ, which have internally the same arrangement as already described about the wheels 19 and 20, are not sprocket wheels turned by a chain but are turned by bevel pinions 62—63 fixed on a shaft 64 and engaging bevel-teeth 65 formed upon the side of the wheels. The wheels 19ᵃ—20ᵃ are guided by rollers 66 formed on the bevel gears, and by other rollers 67. 68ᵃ, 68ᵇ, 68ᶜ and 68ᵈ represent portions of suitable frame work supporting said parts. The shaft 64 may be rotated by a sprocket wheel 69 or any other suitable means of transmitting power to it. I may also use a shaft like 64, pinions 63 with rollers 66 and teeth 65 at both sides of the wheels 19ᵃ—20ᵃ, but as that would only be a matter of preference and no new invention over what is shown, illustration of such duplication is not illustrated.

In Fig. 7 is shown how the friction wheel may be mounted on a stud 70 and turns a special sprocket pinion 71, which engages the chain 18 and thereby turns the wheels 19 and 20. The rod 46, lever 38 and all gears, idlers and friction pinions being just the same as in Figs. 1 and 2, the only difference being in the location upon a frame-portion 72 and engaging the chain 18 direct instead of indirect through the rear sprocket wheel 20.

Having thus described my invention, what I claim is;—

1. In an automobile, the combination with a supporting frame, of a front and rear axle, each divided in the middle, supporting wheels fixed on the outer ends of the axle-section and bevel gears at the inner ends thereof, hubs journaled upon the abutting ends of the axle-sections and provided with radial arms, compensating-gears journaled at the ends of said arms and meshing with the bevel gears, a ring-shaped sprocket-wheel trunnioned on the ends of the journals of the compensating gears, and an endless chain-belt engaging said sprocket wheels and thereby turn the rear and front shaft simultaneously, said front sprocket-wheel having a ring 54 held to it by two diametrically opposite trunnions, and the ring having at ninety degrees from said trunnions internal trunnions at the ends of the journals of the compensating gears, means for imparting rotary motion to said sprocket-wheels, means for guiding the front sprocket wheel, and means for steering the front wheels by swinging the entire front axle in a horizontal plane.

2. In an automobile, the combination with a supporting frame and a front and rear axle and supporting wheels thereon, of sprocket wheels one on each shaft, an endless chain engaging the two wheels to drive them, a spider secured to one side of one of the sprocket-wheels, a friction wheel engaging the spider, and a friction pinion adapted to engage the friction wheel, and means for applying motive power to the friction pinion to turn it.

3. In an automobile, a propelling mechanism involving a driven friction pulley with V-shaped peripheric grooves in its face, a fulcrumed lever adjacent thereto, a driven shaft central with said fulcrum, a gear-wheel fixed on said shaft, means for tilting and holding the lever in various positions, two friction pinions mounted on studs, each having peripheric grooves fitting the friction wheel, and gears fixed to them and receiving rotary motion from said driven gear; an idler-gear interposed between the driven gear and the gear fixed to one of the friction pinions, so as to give it a reverse motion to that of the other pinion; one of said friction pinions having a diametrically reduced portion adapted to impart slow but powerful motion to the friction wheel, and means for bringing the friction wheel and said reduced section of the pinion into operative position and contact when so desired.

4. In an automobile, a propelling mechanism involving a driven friction pulley with V-shaped peripheric grooves in its face, a fulcrumed lever adjacent thereto, a driven shaft central with said fulcrum, a gear wheel fixed on said shaft, means for tilting and holding the lever in various positions, two friction pinions mounted on studs, each having peripheric grooves fitting the friction wheel, and gears fixed to them and receiving motion from said driven gear; an idler-gear interposed between the driven gear and the gear to one of the friction pinions, and means transmitting the rotary motion of the friction wheel to the rear and front axle of the vehicle, substantially as shown and described.

In testimony whereof I affix my signature, in presence of two witnesses.

JOHN E. JOHNSON.

Witnesses:
W. L. BEACH,
E. A. HOFF.